United States Patent
Izawa

(10) Patent No.: US 10,550,026 B2
(45) Date of Patent: Feb. 4, 2020

(54) METHOD FOR TREATING AMMONIA-CONTAINING WATER

(71) Applicant: KURITA WATER INDUSTRIES LTD., Tokyo (JP)

(72) Inventor: Shuhei Izawa, Tokyo (JP)

(73) Assignee: KURITA WATER INDUSTRIES LTD., Tokyo (JP)

(*) Notice: Subject to any disclaimer, the term of this patent is extended or adjusted under 35 U.S.C. 154(b) by 83 days.

(21) Appl. No.: 15/119,234

(22) PCT Filed: Feb. 10, 2015

(86) PCT No.: PCT/JP2015/053645
§ 371 (c)(1),
(2) Date: Aug. 16, 2016

(87) PCT Pub. No.: WO2015/125667
PCT Pub. Date: Aug. 27, 2015

(65) Prior Publication Data
US 2017/0008786 A1  Jan. 12, 2017

(30) Foreign Application Priority Data

Feb. 20, 2014 (JP) .................. 2014-030803

(51) Int. Cl.
*C02F 9/00* (2006.01)
*C02F 1/52* (2006.01)
*C02F 1/72* (2006.01)
*C02F 101/16* (2006.01)
*C02F 1/02* (2006.01)
*C02F 1/66* (2006.01)
*C02F 1/74* (2006.01)
*C02F 101/20* (2006.01)
*C02F 103/16* (2006.01)
*C02F 1/56* (2006.01)

(52) U.S. Cl.
CPC .............. *C02F 9/00* (2013.01); *C02F 1/5245* (2013.01); *C02F 1/722* (2013.01); *C02F 1/02* (2013.01); *C02F 1/56* (2013.01); *C02F 1/66* (2013.01); *C02F 1/74* (2013.01); *C02F 2101/16* (2013.01); *C02F 2101/20* (2013.01); *C02F 2103/16* (2013.01); *C02F 2209/04* (2013.01); *C02F 2209/11* (2013.01)

(58) Field of Classification Search
CPC ....................................................... C02F 9/00
See application file for complete search history.

(56) References Cited

U.S. PATENT DOCUMENTS

2005/0258103 A1* 11/2005 Cort ..................... B03C 1/015
210/695

FOREIGN PATENT DOCUMENTS

| CN | 102603095 A | | 7/2012 | |
|---|---|---|---|---|
| JP | S62-007491 A | | 1/1987 | |
| JP | H02-021995 A | | 1/1990 | |
| JP | H03-44839 B2 | | 7/1991 | |
| JP | 2001-009476 A | | 1/2001 | |
| JP | 2004-284908 | * | 10/2004 | ............... C02F 1/58 |
| JP | 2004-284908 A | | 10/2004 | |
| JP | 2005-076103 A | | 3/2005 | |
| JP | 2007-297662 A | | 11/2007 | |
| JP | 2013-010073 | * | 1/2013 | ............... C02F 1/20 |
| JP | 2013-010073 A | | 1/2013 | |
| JP | 2013-236983 A | | 11/2013 | |

OTHER PUBLICATIONS

PCT/ISA/210, "International Search Report for International Application No. PCT/JP2015/053645," dated Apr. 14, 2015.
PCT/ISA/237, "Written Opinion of the International Searching Authority for International Application No. PCT/JP2015/053645," dated Apr. 14, 2015.
Japan Patent Office, "Office Action for Japanese Patent Application No. 2014-030803," dated Apr. 14, 2015.
"Methods for Cyanide Treatment in Nickel Plating Wastewater" Guo Chong-wu, Li Jian-qiang; Plating and Finishing, vol. 29, No. I Serial No. 172.
Chinese Application No. 201580009006.8; First Office Action dated Apr. 17, 2017.
Chinese Application No. 201580009006.8; Second Office Action dated Sep. 14, 2017.
Chinese Application No. 201580009006.8; Final Office Action dated Dec. 6, 2017.

* cited by examiner

*Primary Examiner* — Peter Keyworth
(74) *Attorney, Agent, or Firm* — Manabu Kanesaka

(57) ABSTRACT

A method for treating ammonia-containing water containing ammonia, metal ions that form a complex with ammonia, and a reducing substance includes a first step of oxidizing the reducing substance by adding hydrogen peroxide to the ammonia-containing water; a second step of aerating the resultant water treated in the first step to remove the ammonia; a third step of forming an insoluble solid at a pH of 7 to 12 by adding at least one compound selected from the group consisting of iron salts, aluminum salts, calcium salts, and calcium hydroxide to the water treated in the second step; and a fourth step of separating the insoluble solid formed in the third step by solid-liquid separation.

5 Claims, No Drawings

METHOD FOR TREATING AMMONIA-CONTAINING WATER

RELATED APPLICATIONS

The present application is National Phase of International Application No. PCT/JP2015/053645 filed Feb. 10, 2015, and claims priority from Japanese Application No. 2014-030803, filed Feb. 20, 2014, the disclosure of which is hereby incorporated by reference herein in its entirety.

FIELD OF THE INVENTION

The present invention relates to a method and an apparatus for treating ammonia-containing water. The present invention particularly relates to a method and an apparatus for treating ammonia-containing water further containing metal ions that form a complex with ammonia, and a reducing substance. The present invention particularly relates to a method and an apparatus that can produce treated water having stable quality, and can reduce an amount of a chemical substance required for treatment and a volume of produced sludge.

BACKGROUND OF THE INVENTION

Electroless plating, particularly autocatalytic electroless plating, generally uses a plating solution containing a reducing substance for supplying electrons and a metal ion source for plating. The plating solution is adjusted to a predetermined pH using ammonia as a pH adjuster. The reducing substance used in the plating solution varies depending on the metal used for plating. Copper plating uses formaldehyde. Nickel plating uses phosphites, hypophosphites, tetrahydroborates, or hydrazines. Gold plating uses tetrahydroborates, ascorbic acid, thiourea, or other reducing substances.

Thus, electroless plating processes produce plating wastewater containing such reducing substances, ammonia, and metal ions. An ammonia molecule has a lone electron pair on its nitrogen atom, so that ammonia acts as a ligand to metal ions in plating wastewater. Accordingly, at least a part of ammonia and metal ions are present in the form of a complex thereof in plating wastewater.

There is proposed a method for treating plating wastewater containing ammonia and metal ions by adding an alkali metal salt of phosphoric acid to the plating wastewater, adjusting it to a pH of 6.5 to 8.5 to precipitate a poorly soluble metal phosphate, and removing the precipitate (see Patent Literature 1).

Also proposed is a method for treating plating wastewater containing phosphorous acid as a reducing substance by oxidizing the phosphorous acid into orthophosphoric acid with hydrogen peroxide and then adding a calcium salt to precipitate calcium phosphate (see Patent Literature 2).

Patent Literature 1: Japanese Patent H3-44839 B
Patent Literature 2: Japanese Patent Publication 2004-284908 A The method of Patent Literature 1 has a problem in that the treatment cost rises considerably due to the use of a treatment chemical containing an alkali metal salt of phosphoric acid, which is relatively expensive. The method further has a problem in that a large amount of sludge are produced. The method also has a problem in that large equipment including a phosphorus removal unit installed downstream is required since phosphorus remains in the treated water.

The method in Patent Literature 2 has a problem in that, during sedimentation of precipitates such as calcium phosphate after a step of oxidizing the reducing substance with hydrogen peroxide, the precipitates float due to oxygen gas produced by the self-decomposition of the hydrogen peroxide remaining after the oxidation step. These precipitates do not settle rapidly and thus decrease the treated water quality.

SUMMARY OF INVENTION

An object of the present invention is to solve the foregoing problems of the related art, and to provide a method and an apparatus for treating wastewater containing ammonia, metal ions that form a complex with ammonia, and a reducing substance. The present invention aims to provide a method and an apparatus that can produce treated water having a high-quality at low cost efficiently, and can reduce an amount of chemical required for treatment and a volume of produced sludge.

After conducting extensive research to achieve the foregoing object, the inventor found that, after the step of oxidizing a reducing substance contained in wastewater by adding hydrogen peroxide, the hydrogen peroxide remaining in the resultant water can be decomposed and removed by aeration from the water, whereby floating and poor flocculation of precipitates during sedimentation at a later step. The inventor also found that ammonia contained in the wastewater can be removed by the aeration, whereby a complex of ammonia with metal ions can be decomposed so that the metal ions can be precipitated and removed as a hydroxide from the wastewater without adding a phosphate salt thereto. The inventor further found that a product produced by oxidizing a reducing substance can be precipitated and removed from the wastewater as a metal salt by adding thereto an insolubilizer such as an iron salt.

The present invention is based on the foregoing findings, and the gist thereof is as follows:

[1] A method for treating ammonia-containing water containing ammonia, metal ions that form a complex with ammonia, and a reducing substance, the method comprising: a first step of oxidizing the reducing substance by adding hydrogen peroxide to the ammonia-containing water; a second step of aerating the resultant water treated in the first step to remove the ammonia; a third step of forming an insoluble solid at a pH of 7 to 12 by adding at least one compound selected from the group consisting of iron salts, aluminum salts, calcium salts, and calcium hydroxide to the water treated in the second step; and a fourth step of separating the insoluble solid formed in the third step by solid-liquid separation.

[2] The method for treating ammonia-containing water according to [1], wherein the ammonia is removed in the second step at a water temperature of 30° C. to 80° C. and a pH of 9 to 13.

[3] The method for treating ammonia-containing water according to [1] or [2], wherein the resultant water treated in the first step is aerated in the second step by blowing an oxygen-containing gas into the water at a flow rate of 0.1 to 10 m³/min (normal) per cubic meter of the water.

[4] The method for treating ammonia-containing water according to any one of [1] to [3], wherein the metal ions that form a complex with ammonia are nickel ions.

[5] The method for treating ammonia-containing water according to any one of [1] to [4], wherein the reducing substance is hypophosphorous acid.

[6] An apparatus for treating ammonia-containing water containing ammonia, metal ions that form a complex with ammonia, and a reducing substance, the apparatus comprising: an oxidizer for oxidizing the reducing substance by adding hydrogen peroxide to the ammonia-containing water; an aerater for aerating the resultant water treated by the oxidizer to remove the ammonia; an insolubilizing device for forming an insoluble solid at a pH of 7 to 12, the adder adding at least one compound selected from the group consisting of iron salts, aluminum salts, calcium salts, and calcium hydroxide to the water treated by the aerater; and a solid-liquid separator for separating the insoluble solid formed by adding the insolubilizing agent to the water.

Advantageous Effects Of Invention

According to the present invention, wastewater containing ammonia, metal ions that form a complex with ammonia, and a reducing substance can be treated to stably produce high-quality treated water at low cost and efficiently while reducing the amount of a chemical substance for treatment and the amount of sludge produced by the treatment.

DESCRIPTION OF EMBODIMENTS

Embodiments of the present invention will now be described in detail.

[Method for Treating Ammonia-Containing Water]
<Ammonia-Containing Water>

The ammonia-containing water to be treated in the present invention contains ammonia, metal ions that form a complex with ammonia, and a reducing substance. An example of the ammonia-containing water includes plating wastewater such as electroless plating wastewater. The ammonia-containing water to be treated in the present invention is not limited to plating wastewater, but may be any other water containing ammonia, metal ions that form a complex with ammonia, and a reducing substance.

Examples of metal ions, that form a complex with ammonia, present in the ammonia-containing water include nickel, zinc, copper, silver, mercury, cadmium, and cobalt ions, but not limitative thereto. The ammonia-containing water may contain one or more metal ion species that form a complex with ammonia.

Non-limitative examples of reducing substances contained in the ammonia-containing water include phosphorus-containing acids such as phosphorous acid and hypophosphorous acid and salts thereof, metal ions such as ferrous ions and salts thereof, and other compounds such as formaldehyde, thiourea, hydrazine, formic acid, ascorbic acid, dimethylamine borane, and trimethylamine borane.

The ammonia-containing water may contain one or more kinds of reducing substances.

The ammonia-containing water may contain ammonia, the metal ions that form a complex with ammonia, and the reducing substance in any concentration.

Electroless plating wastewater usually contains ammonia in a concentration of about 200 to 50,000 mg/L as $NH_4$—N, metal ions that form a complex with ammonia in a concentration of about 10 to 10,000 mg/L, and a reducing substance in a concentration of about 10 to 100,000 mg/L and has a pH of about 10 to 14.

<First Step>

The first step involves a process of oxidizing the reducing substance contained in the raw ammonia-containing water by adding hydrogen peroxide to the ammonia-containing water.

The first step is preferably performed at a water temperature of 20° C. to 100° C., particularly 40° C. to 90° C. The number of moles of hydrogen peroxide added is 1 or more times, preferably 1 to 3 times, that of the reducing substance contained in the ammonia-containing water.

The amount of hydrogen peroxide added to the ammonia-containing water may be controlled based on the results of measurements of parameters such as a dissolved oxygen (DO) concentration, oxidation-reduction potential (ORP), and turbidity of the water on treatment.

The reaction time in the first step is usually about 10 minutes to 2 hours.

<Second Step>

The second step involves a process of aerating the water from the first step in which the reducing substance has been oxidized during the first step. The aeration process of the second step removes the ammonia, and decomposes and removes residual hydrogen peroxide from the water.

In the second step, the wastewater treated in the first step is preferably aerated with an oxygen-containing gas at a pH of 9 to 13, more preferably 10 to 12, and at a water temperature of 30° C. to 80° C., more preferably 40° C. to 70° C. When the water fed to the second step from the first step has a pH of 9 to 13, the water is not necessarily to be adjusted in its pH. When the pH thereof is less than 9, it is adjusted by adding an alkali. If the pH of the water to be treated in the second step solution is less than 9, the ammonia removal efficiency may decrease significantly. If the pH is adjusted excessively high, a problem may occur with the alkali resistance of the reactor and other equipment, and the alkali for pH adjustment is spent excessively. Therefore, the pH should not exceed the above upper limit.

The oxygen-containing gas used for aeration may be any gas containing oxygen, for example, air. The oxygen-containing gas may also be an oxygen-enriched gas.

The water may be aerated in any way, for example, through a nozzle or porous plate disposed at a bottom of an aeration tank. The water may also be aerated by finely dispersing a gas supplied through a nozzle with a stirring impeller disposed near the bottom of the tank.

During the aeration, the oxygen-containing gas is preferably blown into the water at a flow rate of 0.1 to 10 m$^3$/min (normal), more preferably 0.5 to 5 m$^3$/min (normal), per cubic meter of the water. If the oxygen-containing gas is blown into the water at a flow rate of less than 0.1 m$^3$/min (normal), hydroxide precipitates of metal ions liberated from the complex by the removal of ammonia may settle in the tank or may adhere to and clog the pores of the aerator. If the oxygen-containing gas is blown into the reaction solution at a flow rate of more than 10 m$^3$/min (normal), the efficiency of contact between the oxygen-containing gas and the wastewater may decrease due to the excessive volume of the aeration tank, and power consumption for oxygen blowing becomes excessive.

The aeration time in the second step is usually about 1 to 20 hours, depending on the pH, the flow rate of the oxygen-containing gas, the amount of ammonia treated, and the amount of residual hydrogen peroxide.

<Third Step>

The third step involves a process of insolubilizing the metal ions as a hydroxide by adjusting a pH from 7 to 12, preferably 8 to 11, by adding an iron salt, aluminum salt, calcium salt, or calcium hydroxide as an insolubilizer and an acid or alkali as a neutralizer to the resultant water from the second step where ammonia and residual hydrogen peroxide have been removed. A pH of less than 7 does not allow the metal ions liberated from the complex by aeration in the second step to be precipitated as a hydroxide. A pH of more than 12 has no greater effect and is disadvantageous in terms of cost. If the insolubilizer is not added, the hydroxide precipitates may redissolve. The addition of the insolubilizer allows formation of stable precipitates. If the oxidation product of the reducing substance, such as phosphoric acid, needs to be removed, it can be precipitated and removed as an insoluble salt by adding the insolubilizer.

Examples of neutralizers include acids such as hydrochloric acid and sulfuric acid and alkali metal hydroxides such as sodium hydroxide and potassium hydroxide.

These neutralizers may be used alone or in combination. The neutralizer used in the third step is not necessarily an acid, but may be an alkali. Even when the second step is performed at a pH of 9 to 13, preferably 10 to 12, the pH generally decreases to about 8 to 11 by aeration in the second step since ammonia is volatile.

Examples of insolubilizers include iron salts such as ferric chloride, aluminum salts such as polyaluminum chloride and aluminum sulfate, and calcium salts such as calcium chloride.

Calcium hydroxide may be used instead of calcium chloride. Calcium hydroxide, being an alkali, can also serve as a neutralizer.

Iron salts, aluminum salts, calcium salts, and calcium hydroxide, serving as insolubilizers, may be used alone or in combination. These insolubilizers are usually added in an amount, expressed as a metal amount, of about 5 to 500 mg/L, preferably about 10 to 100 mg/L, depending on the metal ion concentration and concomitant salt concentration of the aerated water.

The reaction time in the third step is preferably about 5 to 30 minutes.

<Fourth Step>

The fourth step involves a process of separating insoluble solids formed in the third step.

Examples of a solid-liquid separating device include a sedimentation tank, a dissolved-air flotation tank, a filter press, and a centrifuge.

Prior to solid-liquid separation, the resultant water obtained in the third step may be subjected to flocculation by adding a polymer flocculant such as an anionic polymer flocculant in an amount of about 0.5 to 20 mg/L to form coarse insoluble solids.

<Treated Water>

According to the present invention, high-quality treated water can be stably produced by treating wastewater through the first to fourth steps. The treated water usually has an SS (suspended solids) concentration of 20 mg/L or less, an $NH_4$—N concentration of 20 to 2,000 mg/L, a metal ion concentration of 5 mg/L or less, and a reducing substance concentration of 50 mg/L or less. The present invention reduces the amount of the chemical substance to be used, so that the amount of produced sludge and the treatment cost can be sufficiently reduced as compared to conventional methods.

[Apparatus for Treating Ammonia-Containing Water]

An apparatus for treating ammonia-containing water according to the present invention is an apparatus for treating ammonia-containing water containing ammonia, metal ions that form a complex with ammonia, and a reducing substance. The treatment apparatus includes an oxidizing device for oxidizing the reducing substance by adding hydrogen peroxide to the ammonia-containing water; an aerating device for aerating the resultant water obtained by the oxidizing device to remove the ammonia; an insolubilizing device for forming an insoluble solid at a pH of 7 to 12 by adding the insolubilizer described above to the water treated by the aerating device; and a solid-liquid separating device for separating the insoluble solid formed by the insolubilizing device.

A treatment apparatus according to an aspect of the present invention includes a reaction tank into which the ammonia-containing water to be treated is introduced and in which the reducing substance contained in the ammonia-containing water is oxidized by adding hydrogen peroxide to the ammonia-containing water and stirring the ammonia-containing water, preferably at a water temperature of 20° C. to 100° C., more preferably 40° C. to 90° C.; an aeration tank into which the resultant water is introduced from the reaction tank and in which the resultant water is aerated with an oxygen-containing gas under the predetermined conditions described above; a reaction tank into which the water thus aerated is introduced from the aeration tank and in which the resultant water is subjected to insolubilization by adding the insolubilizer and neutralizer described above; and the solid-liquid separating device described above, into which the resultant water is introduced from the reaction tank.

The above treatment apparatus may include a flocculation tank between the insolubilization reaction tank and the solid-liquid separating device to perform flocculation with a polymer flocculant.

EXAMPLES

The present invention will be further illustrated by the following examples and comparative examples.

In the examples and comparative examples, raw water having the below water quality was used. The raw water contained nickel ions as metal ions that form a complex with ammonia, and hypophosphorous acid as a reducing substance.

TABLE 1

| <Raw water quality> | | |
| --- | --- | --- |
| Item | Unit | Raw water |
| pH | — | 11.2 |
| $NH_4$—N | mg/L | 7500 |
| Ni | mg/L | 192 |
| $PO_2$—P | mg/L | 15 |

Sodium hydroxide (NaOH) was used as an alkali. Hydrochloric acid (HCl) was used as an acid. Calcium chloride ($CaCl_2$) was used as an insolubilizer. Sodium phosphate ($Na_3(PO_4)$) was used as a phosphate salt. Kuriflock PA331 anionic polymer flocculant available from Kurita Water Industries Ltd. was used as a polymer flocculant.

Comparative Example 1: Method in Patent Literature 1

Sodium phosphate was added to the raw water in an amount of 80 mg P/L. The raw water was adjusted to a pH of 7.5 with hydrochloric acid and was reacted by stirring for 20 minutes. Kuriflock PA331 was then added to the resultant water in an amount of 3 mg/L for flocculation treatment. The water thus treated was allowed to stand, and the supernatant was taken out. The quality of the supernatant and the amount of sludge produced are shown in Table 2.

In Comparative Example 1, where the nickel ions in the raw water were precipitated as nickel phosphate through the reaction with orthophosphate ions, the nickel concentration of the treated water decreased to 7 mg/L. Hypophosphorous acid, which does not react with nickel, was not eliminated and remained in the treated water in an amount of 15 mg-P/L. Orthophosphoric acid also remained in an amount of 16 mg-P/L.

Comparative Example 2

Hydrogen peroxide was added to the raw water in an amount of 100 mg/L (3 times the number of moles of hypophosphorous acid in the raw water). The raw water was reacted at a water temperature of 70° C. for 30 minutes. Subsequently, the resultant water was treated in the same manner as in Comparative Example 1. The quality of the supernatant and the amount of sludge produced are shown in Table 2.

In Comparative Example 2, where hypophosphorous acid was oxidized into orthophosphoric acid by hydrogen peroxide, the hypophosphorous acid concentration decreased to 1 mg-P/L. However, orthophosphoric acid remained in an amount of 29 mg-P/L. The supernatant had a high SS concentration since precipitates floated due to residual hydrogen peroxide and did not settle well.

Example 1

Hydrogen peroxide was added to the raw water in an amount of 100 mg/L (3 times the number of moles of hypophosphorous acid in the raw water). The raw water was reacted at a water temperature of 70° C. for 30 minutes. The water thus reacted was then aerated with air at a pH of 11, a water temperature of 60° C., and a flow rate of 1.5 m$^3$/min (normal) per cubic meter of the reaction solution for 8 hours. After the aeration, calcium chloride was added to the water thus aerated (pH 9.5) in an amount of 30 mg-Ca/L. The water was adjusted to a pH of 10.5 with sodium hydroxide and was reacted by stirring for 20 minutes. Kuriflock PA331 was then added to the water thus reacted in an amount of 3 mg/L for flocculation treatment. The water thus treated was allowed to stand, and the supernatant was taken out. The quality of the supernatant and the amount of sludge produced are shown in Table 2.

In Example 1, the complex of ammonia with nickel were decomposed by the removal of ammonia through aeration, and the nickel ions were precipitated and removed as nickel hydroxide. Orthophosphoric acid, which was produced by the oxidation of hypophosphorous acid, was precipitated and removed as calcium phosphate through the reaction with calcium. No residual hydrogen peroxide was detected, and precipitates settled well.

TABLE 2

<Treatment results>

| Item | | Unit | Comparative Example 1 | Comparative Example 2 | Example 1 |
|---|---|---|---|---|---|
| Supernatant quality | SS | mg/L | 3 | 50 | 3 |
| | $NH_4$—N | mg/L | 7500 | 7500 | 140 |
| | Ni(soluble) | mg/L | 7 | 5 | 0.5 |
| | $PO_4$—P(soluble) | mg/L | 16 | 29 | <1 |
| | $PO_2$—P(soluble) | mg/L | 15 | 1 | 1 |
| | $H_2O_2$ | mg/L | <1 | 17 | <1 |
| Amount of sludge produced | | mg-dry/L of raw water | 385 | 388 | 372 |

Whereas particular embodiments of the present invention have been described in detail, it will be obvious to those skilled in the art that various modifications are possible without departing from the spirit or scope of the present invention.

The present application is based on Japanese Patent Application No. 2014-030803 filed on Feb. 20, 2014, the entire contents of which are incorporated herein by reference.

The invention claimed is:

1. A method for treating ammonia-containing water, comprising:
   obtaining electroless plating wastewater containing ammonia in a concentration of 200 to 50,000 mg/L as $NH_4$—N, metal ions that form a complex with ammonia in a concentration of 10 to 10,000 mg/L, and a reducing substance in a concentration of 10 to 100,000 mg/L, and having a pH of 10 to 14,
   a first step of oxidizing the reducing substance by adding hydrogen peroxide to the ammonia-containing water, thereby producing a resultant water;
   a second step of blowing an oxygen-containing gas into the resultant water at a flow rate of 0.1 to 10 m$^3$/min (normal) per cubic meter of the resultant water, thereby aerating the resultant water treated in the first step and removing the ammonia;
   a third step of
     adding a neutralizer including at least one of hydrochloric acid, sulfuric acid, sodium hydroxide, and potassium hydroxide to water treated in the second step, thereby insolubilizing the metal ions as a hydroxide at a pH of 7 to 12,
     adding an insolubilizer including at least one of ferric chloride, polyaluminum chloride, aluminum sulfate, calcium chloride, and calcium hydroxide in an amount of 5 to 500 mg/L as a metal amount to water to which the neutralizer is added, thereby precipitating the hydroxide, and
     adding an anionic polymer flocculant in an amount of 0.5 to 20 mg/L, thereby coarsening the hydroxide; and
   a fourth step of separating the hydroxide formed in the third step by solid-liquid separation, thereby obtaining treated water,
   wherein the treated water has a suspended solids concentration of 20 mg/L or less, the ammonia in the concentration of 20 to 2,000 mg/L as $NH_4$—N, the metal ions in the concentration of 5 mg/L or less, and the reducing substance in the concentration of 50 mg/L or less.

2. The method for treating ammonia-containing water according to claim 1, wherein the ammonia is removed in the second step at a water temperature of 30° C. to 80° C. and a pH of 9 to 13.

3. The method for treating ammonia-containing water according to claim 1, wherein the metal ions that form a complex with ammonia are nickel ions.

4. The method for treating ammonia-containing water according to claim 1, wherein the reducing substance is hypophosphorous acid.

5. The method for treating ammonia-containing water according to claim 1, wherein the first step is performed at a water temperature of 20° C. to 100° C. for 10 minutes to 2 hours, and
    a number of moles of the hydrogen peroxide added is 1 to 3 times of the reducing substance contained in the ammonia-containing water.

\* \* \* \* \*